(12) United States Patent  
Pant et al.

(10) Patent No.: US 8,857,159 B2
(45) Date of Patent: Oct. 14, 2014

(54) SYSTEMS AND METHODS FOR REDUCING $NO_x$ BREAKTHROUGH

(75) Inventors: Atul Pant, Bangalore (IN); Karthik Ramanathan, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 635 days.

(21) Appl. No.: 12/626,026

(22) Filed: Nov. 25, 2009

(65) Prior Publication Data

US 2011/0120099 A1 May 26, 2011

(51) Int. Cl.
*F01N 3/00* (2006.01)

(52) U.S. Cl.
USPC ............. 60/287; 60/288; 60/300; 60/303; 60/286; 422/177

(58) Field of Classification Search
USPC ........... 60/286, 287, 288, 300, 303; 422/177; 2/286, 287, 288, 300, 303
See application file for complete search history.

(56) References Cited

U.S. PATENT DOCUMENTS

| | | | | |
|---|---|---|---|---|
| 5,085,050 | A | * | 2/1992 | Katoh .............................. 60/288 |
| 5,349,816 | A | * | 9/1994 | Sanbayashi et al. ............. 60/277 |
| 5,740,669 | A | * | 4/1998 | Kinugasa et al. ................ 60/285 |
| 5,921,076 | A | * | 7/1999 | Krutzsch et al. ................ 60/274 |
| 5,934,073 | A | * | 8/1999 | Gieshoff et al. ................ 60/320 |
| 5,987,885 | A | * | 11/1999 | Kizer et al. ..................... 60/298 |
| 5,992,142 | A | * | 11/1999 | Pott ................................ 60/274 |
| 6,014,859 | A | * | 1/2000 | Yoshizaki et al. .............. 60/285 |
| 6,021,640 | A | * | 2/2000 | Hirota et al. .................... 60/300 |
| 6,722,125 | B1 | * | 4/2004 | Pfalzgraf ......................... 60/295 |
| 6,854,263 | B1 | * | 2/2005 | Bruck et al. ..................... 60/285 |
| 2002/0073694 | A1 | * | 6/2002 | Minami ........................... 60/288 |
| 2003/0213232 | A1 | * | 11/2003 | Brisley et al. ................... 60/285 |
| 2004/0052693 | A1 | * | 3/2004 | Crane et al. ................... 422/173 |
| 2004/0112046 | A1 | * | 6/2004 | Tumati et al. ................... 60/297 |
| 2005/0262832 | A1 | * | 12/2005 | Itoh et al. ....................... 60/286 |
| 2006/0010859 | A1 | * | 1/2006 | Yan et al. ....................... 60/286 |
| 2006/0021332 | A1 | * | 2/2006 | Gaiser ............................ 60/286 |
| 2006/0272316 | A1 | * | 12/2006 | Miyashita ....................... 60/282 |
| 2008/0271440 | A1 | * | 11/2008 | Xu et al. ......................... 60/295 |
| 2008/0307779 | A1 | * | 12/2008 | El-Malki et al. ............... 60/299 |
| 2009/0114196 | A1 | * | 5/2009 | Haugen .......................... 123/575 |
| 2010/0107611 | A1 | * | 5/2010 | Cleary et al. ................... 60/288 |

FOREIGN PATENT DOCUMENTS

JP 2008202528 A * 9/2008

OTHER PUBLICATIONS

Machine Translation of JP-2008-202528, Machine Translationed on Aug. 5, 2013.*

* cited by examiner

*Primary Examiner* — Thomas Denion
*Assistant Examiner* — Patrick Maines
(74) *Attorney, Agent, or Firm* — Parks IP Law LLC; Mickki D. Murray

(57) ABSTRACT

An exhaust system includes main line that runs through a three way converter (TWC) and then a lean $NO_x$ trap (LNT). The exhaust system further includes a bypass line configured to bypass the TWC. The LNT includes catalyst that is non-uniformly distributed along the longitudinal axis. The catalyst is distributed such that storage sites are weighted toward the upstream end of the LNT and oxidation and reduction sites are weighted toward the downstream end of the LNT.

19 Claims, 4 Drawing Sheets

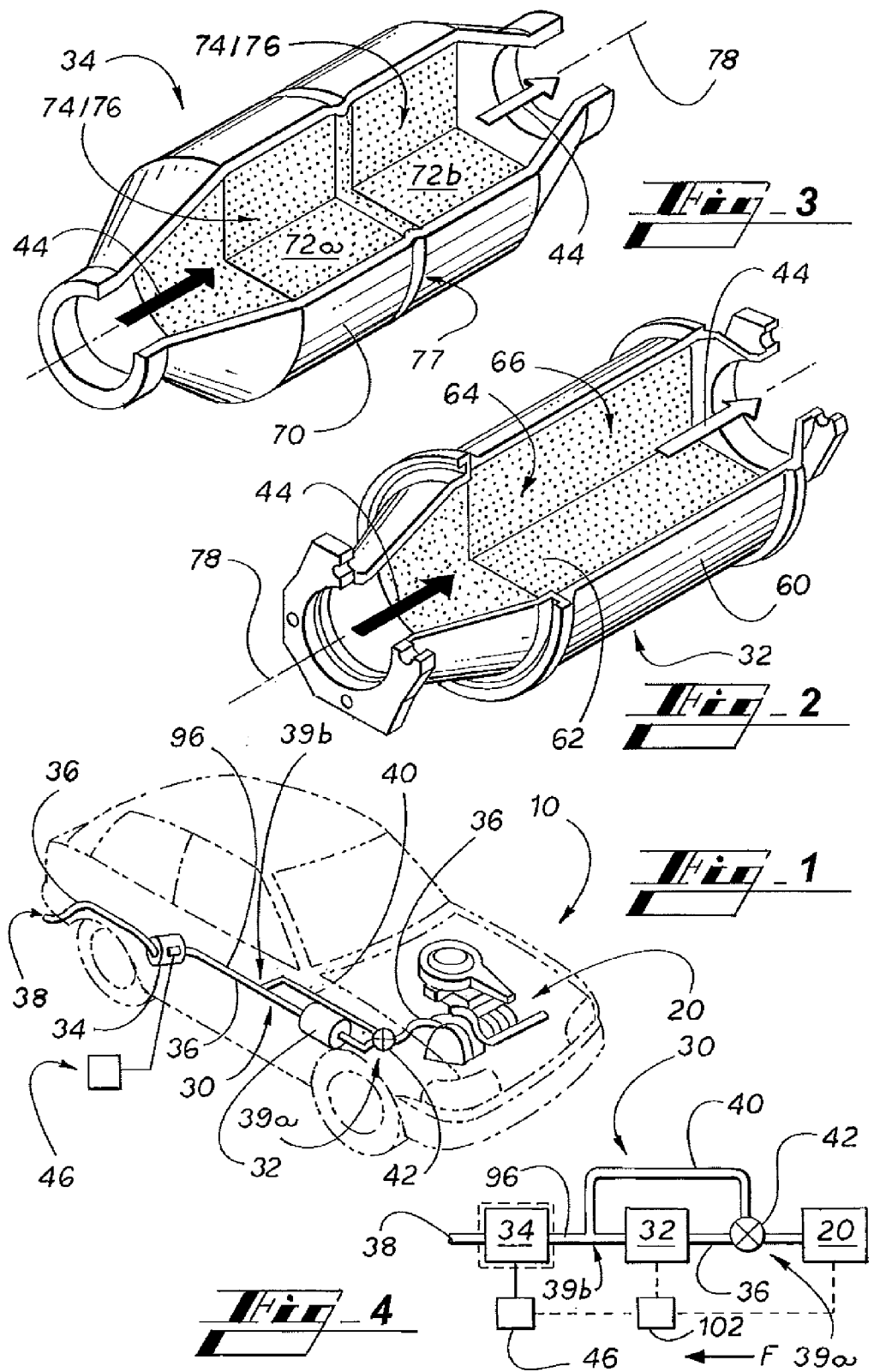

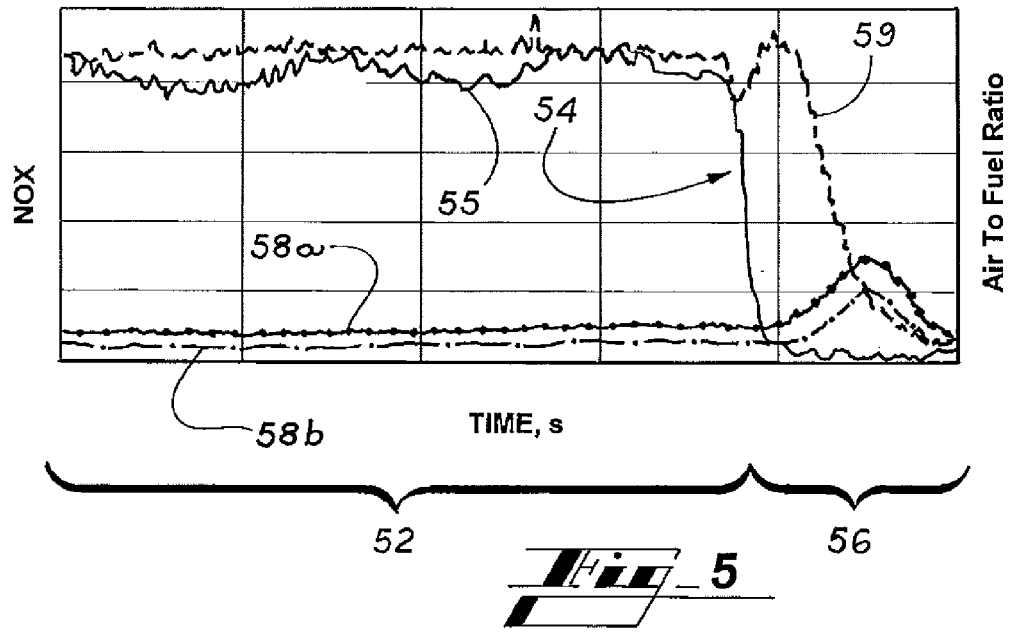
Fig_5
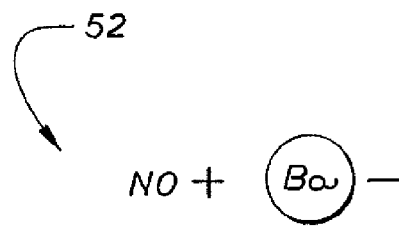
Fig_6
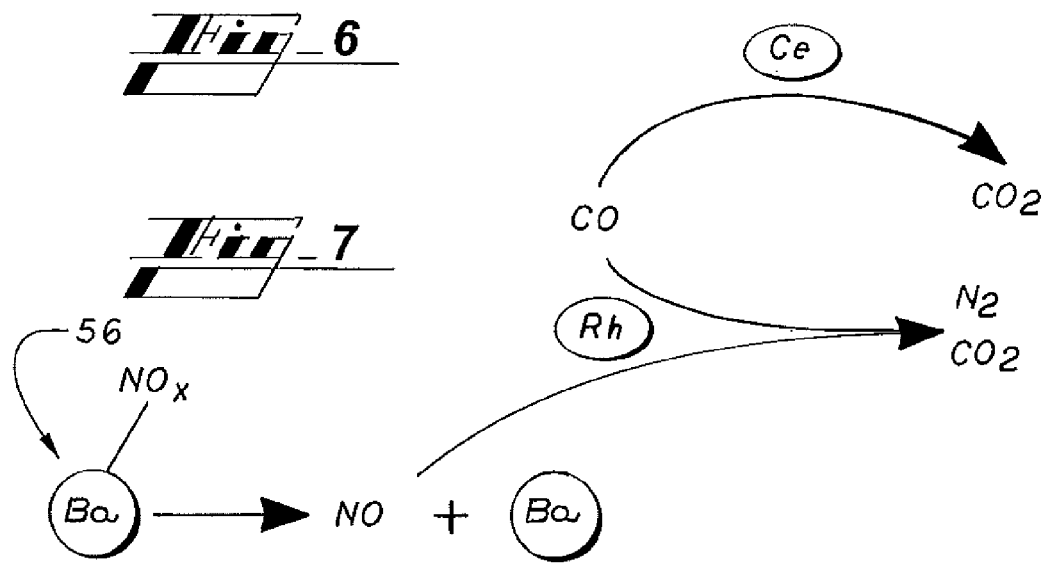
Fig_7

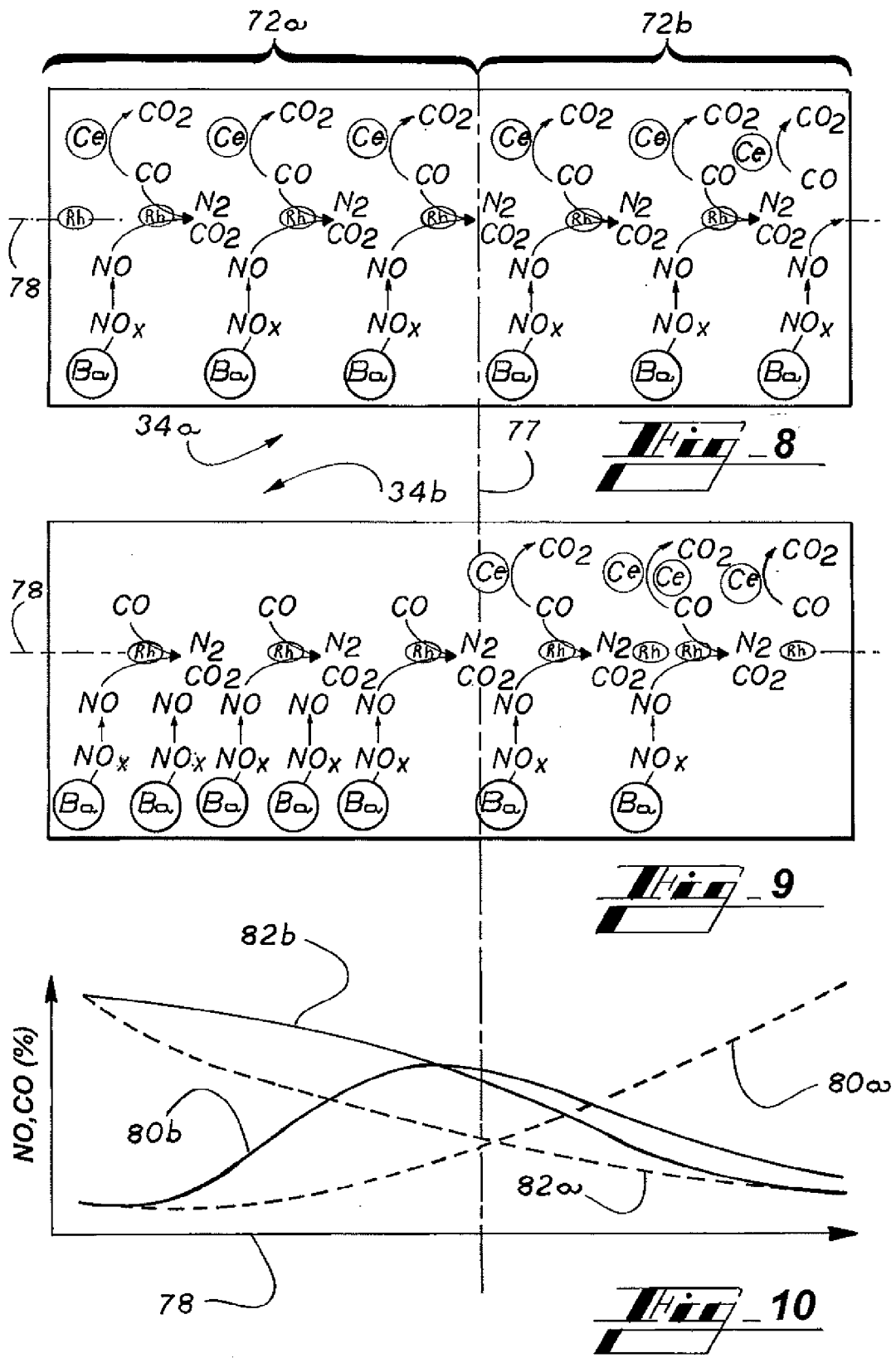

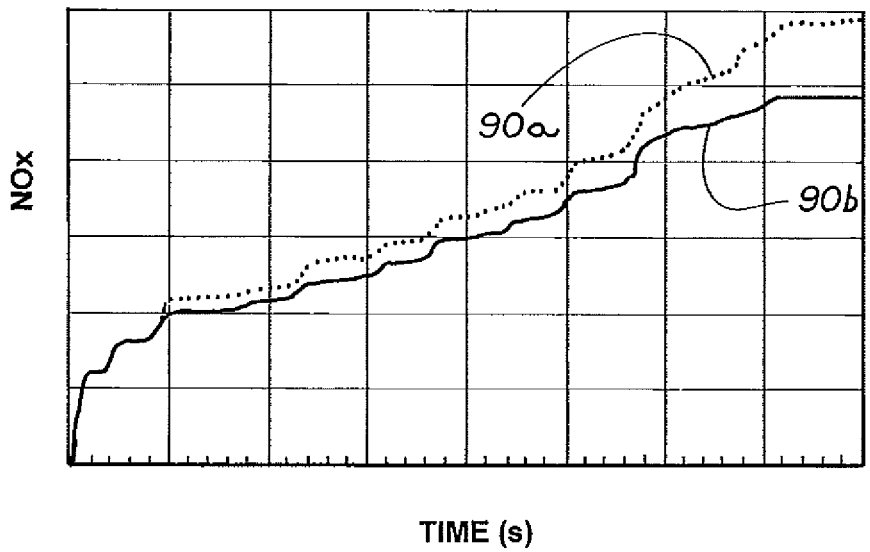
Fig_11
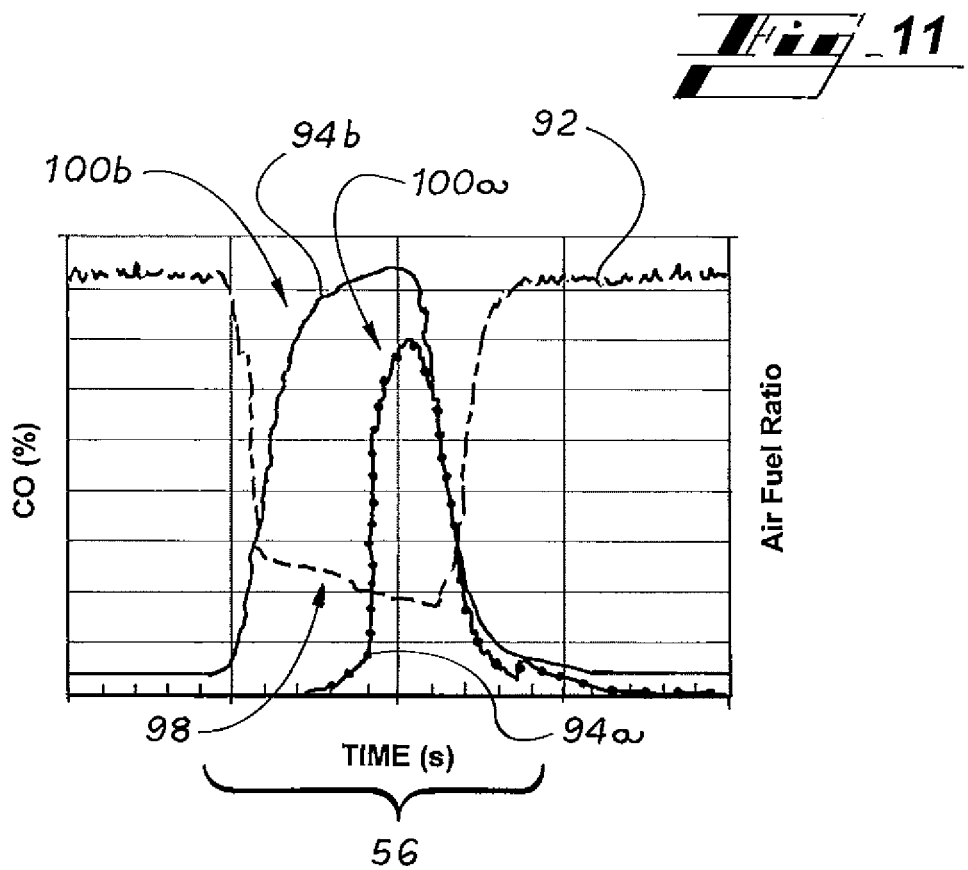
Fig_12

SYSTEMS AND METHODS FOR REDUCING NO$_x$ BREAKTHROUGH

TECHNICAL FIELD

This disclosure relates generally to systems and methods for reducing NO$_x$ breakthrough.

BACKGROUND

Minimizing vehicle engine emissions is desirable to reduce environmental impacts as well as to comply with governmental mandates, such as regulations promulgated by the United States Environmental Protection Agency (EPA).

In a typical after-treatment architecture, the engine exhaust is sent through a three way converter (TWC), after which it passes through a lean NO$_x$ trap (LNT) before leaving through an exhaust pipe. The LNT stores NO$_x$ during lean engine operations and, when LNT storage capacity is reached, the stored NO$_x$ is reduced by rich tip-ins (rich operation). NO$_x$ will slip or breakthrough during the transition from lean to rich engine operation and this slip amounts to significant exhaust pipe emissions. Thus, there is a need to reduce LNT NO$_x$ breakthrough.

SUMMARY

The various embodiments of the present disclosure overcome the shortcomings of the prior art by providing systems and methods for reducing NO$_x$ breakthrough.

According to one aspect of the disclosure, a lean NO$_x$ trap (LNT) includes a core with catalyst that is non-uniformly distributed along the longitudinal axis of the LNT. Catalyst is distributed such that storage sites are weighted toward the upstream end of the LNT and oxidation and reduction sites are weighted toward the downstream end of the LNT.

According to another aspect of the disclosure, an exhaust system includes a main line with a three way converter (TWC) and an LNT positioned downstream of the TWC. The exhaust system further includes a bypass line configured to allow an exhaust gas stream to bypass the TWC.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

BRIEF DESCRIPTION OF THE DRAWINGS

FIG. 1 is a perspective view of a vehicle with an exhaust system, according to an exemplary embodiment.

FIG. 2 is a partial perspective view of a three way converter (TWC) of the exhaust system of FIG. 1.

FIG. 3 is a partial perspective view of a lean NO$_x$ trap (LNT) of the exhaust system of FIG. 1.

FIG. 4 is a schematic diagram of the exhaust system of FIG. 1

FIG. 5 is a graphical illustration of an engine cycle, according to an exemplary embodiment.

FIG. 6 is an illustration of a chemical reaction during lean operation, according to an exemplary embodiment.

FIG. 7 is an illustration of chemical reactions during rich operation, according to an exemplary embodiment.

FIG. 8 is a schematic diagram of a typical LNT, according to an exemplary embodiment.

FIG. 9 is a schematic diagram of a modified LNT, according to an exemplary embodiment.

FIG. 10 is a graphical illustration of NO and CO concentration of the typical LNT of FIG. 8 and the modified LNT of FIG. 9.

FIG. 11 is a graphical illustration of aggregate NOx over a number of cycles of a typical LNT and a modified LNT.

FIG. 12 is a graphical illustration of CO concentration of a typical exhaust system and of the exhaust system of FIGS. 1 and 4.

DETAILED DESCRIPTION

As required, detailed embodiments are disclosed herein. It must be understood that the disclosed embodiments are merely exemplary of the disclosure that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary systems and methods described herein are configured to reduce emissions, improve de-NO$_x$ efficiency, improve fuel economy, and increase the efficiency of catalyst or catalyst sites used in lean NO$_x$ traps (LNT). Such systems and methods include any of a LNT with a weighted distribution of catalyst sites, after treatment architecture for bypassing a three way converter (TWC) during rich tip-ins, and a device for controlling the temperature of the LNT during rich tip-ins (rich operation).

In general, the systems and methods described herein are described in the context of a vehicle with a lean burn engine. However, the systems and methods can also be applied to other machines such as forklifts, aerial boom lifts, ice resurfacing machines, construction equipment, and the like having engines including "large spark ignition" (LSI) engines, spark ignition (gasoline) engines, liquefied petroleum gas (LPG) engines, engines of flexible fuel vehicles burning various blends of E85 and gasoline, compressed natural gas (CNG) engines, and compression ignition (diesel) engines.

As used herein, "NO$_x$" refers to mono-nitrogen oxides—both nitric oxide (NO) and nitrogen dioxide (NO$_2$), "HC" refers to hydrocarbons, and "CO" refers to carbon monoxide.

As used herein, the terms "lean burn," "lean operation," and "lean cycle" refer to operation or the part of an engine cycle when the oxygen relative to fuel is more than that of stoichiometry. This results in a relatively high air-fuel ratio in the exhaust gas stream during the lean cycle. Further, the terms "rich burn," "rich operation," "rich cycle," and "rich tip-in" refer to operation or the part of an engine cycle when more fuel is injected into an exhaust gas stream and the oxygen relative to fuel is less than that of stoichiometry. This results in a relatively low air-fuel ratio during the rich cycle.

As used herein, the terms "uniform" and "non-uniform" describe the distribution of catalyst sites, for example, between the entrance and exit of the catalytic converter. The term "distribution" refers to the concentration of catalyst sites along a length or axis or in an area of the catalytic converter.

As used herein, the terms "upstream" and "downstream" refer to location with respect to the flow direction F of an exhaust gas stream. Such terms can be used to describe the relative positions of elements with respect to one another.

Generally described, the systems and methods described herein are designed to reduce $NO_x$ breakthrough in the LNT. The systems and methods include various catalyst and exhaust architecture or designs. As described in further detail below, LNT catalyst design includes catalyst sites that are non-uniformly distributed along the LNT converter length. Exhaust system architecture includes the use of a diverter valve to bypass the TWC during rich tip-ins and the use of a temperature control device to reduce the temperature of the LNT during the beginning of rich tip-ins. Each of the modifications can reduce breakthrough significantly. The modifications can be used individually or in combination.

Referring to FIGS. 1-4, a vehicle 10 includes an engine 20 and an exhaust system 30. The exhaust system 30 includes a three way converter (TWC) 32 downstream from the engine 20 and a lean $NO_x$ trap (LNT) 34 downstream from the TWC 32. A main exhaust line 36 connects the engine 20 to the TWC 32, the TWC 32 to the LNT 34, and the LNT 34 to an outlet 38. A bypass line 40 connects to the main exhaust line 36 on opposed sides of the TWC 32. An upstream bypass line connection point 39a is between the engine 20 and the TWC 32 and a downstream bypass line connection point 39b is between the TWC 32 and the LNT 34. A valve 42 is located at the upstream bypass line connection point 39a and controls or directs flow of an exhaust gas stream 44 from the engine 20 through the TWC 32 or the bypass line 40. As described in further detail below, the valve 42 directs the exhaust gas stream 44 through the TWC 32 or the bypass line 40 depending on whether the engine operation is lean or rich. In contrast to typical exhaust architecture, the flow of the exhaust gas stream 44 through the two components, the TWC 32 and the LNT 34, in sequence can be altered by the valve 42 and the bypass line 40.

The exhaust system 30 further includes a LNT temperature control device 46 coupled to the LNT 34, which is configured to cool the LNT 34 during rich operation.

General operation of the exhaust system 30 is now briefly described. The exhaust system 30 is configured to convert pollutants in an exhaust gas stream 44, such as $NO_x$, CO, and HC, to less toxic substances. During the lean cycle, for example, a higher air-fuel ratio in combination with catalysts in the TWC 32 encourage oxidation processes such as oxidation of carbon monoxide (CO) to carbon dioxide and oxidation of unburned hydrocarbons (HC) to carbon dioxide ($CO_2$) and water ($H_2O$). During lean operation, $NO_x$ is not substantially reduced by the exemplary TWC 32 and continues through the main exhaust line 36 to the LNT 34 where it is stored. A rich cycle is typically performed as or before the LNT 34 becomes full to regenerate the LNT 34. During the rich cycle, for example, the lower air-fuel ratio, in combination with catalysts of the LNT 34, encourage reduction of nitrogen oxides ($NO_x$) to nitrogen. As an example, reductants like carbon monoxide (CO), formed during a rich cycle, are used in the reduction of $NO_x$.

FIGS. 5-7 illustrate general operation of the LNT 34. $NO_x$ generated by engine 20 in the lean period 52 (storage period) is stored on the LNT 34. When storage capacity is reached, a rich pulse 54 (high fuel, low oxygen) is provided to convert the stored $NO_x$ to $N_2$. The rich pulse 54 is illustrated by the drop in the air to fuel ratio 55. FIGS. 6 and 7 depict typical chemistry during the lean cycle 52 and the rich cycle 56. In this illustration, CO is used as a reductant.

Continuing with FIG. 5, a problem associated with the operation of a typical LNT is that, when switching from a lean cycle 52 to a rich cycle 56, some $NO_x$ escapes the typical LNT without reduction. The escaping $NO_x$ is shown by a peak in the $NO_x$ out 58a during the rich cycle 56 (regeneration period). The $NO_x$ in 59 is shown for purposes of illustration. As described in further detail below, in the illustrated embodiments, the distribution of different catalyst is altered so as to reduce the amount of $NO_x$ escaping the LNT 34.

Referring again to FIG. 2, the illustrated TWC 32 includes a shell 60, a core 62 or substrate, a washcoat 64, and catalysts or catalyst sites 66. The core 62 is typically a ceramic honeycomb or stainless steel foil honeycomb. The honeycomb surface supports the catalyst sites 66 and is often called a "catalyst support". The washcoat 64 is typically a mixture of silica and alumina that, when applied to the core 62, gives the core 26 a rough, irregular surface and a greater surface area. The greater surface area provides more area for active catalyst sites 66. Catalysts 66 are added to the washcoat 64 before application to the core 62. Catalysts 66 include precious metals such as platinum (Pt), palladium (Pd), rhodium (Rh), ceria (Ce), iron (Fe), manganese (Mn), nickel (Ni), copper (Cu), barium (Ba), and potassium (K), and the like. As described herein, different catalysts 66 provide different functions such as the storage of $NO_x$, the reduction of $NO_x$, and the oxidation of CO.

Referring now to FIG. 3, the illustrated LNT 34 includes a shell 70, a core 72, a washcoat 74, and catalysts or catalyst sites 76. Generally described, the LNT 34 catalyst is similar to the TWC 32 catalyst in composition and structure except the LNT 34 catalyst includes additional active species for $NO_x$ storage. The additional active species can include alkaline earth metals such as barium (Ba).

In a typical converter or LNT, the catalyst 66 is uniformly distributed everywhere in the washcoat 74. In contrast, in the exemplary embodiments, the composition of catalyst 66 is non-uniformly distributed along longitudinal axis 78 in order to achieve a gradient of various active species. An exemplary non-uniform catalyst distribution is shown in FIG. 9.

As described in further detail below, to facilitate distributing catalyst sites 66 along the length or longitudinal axis 78 of the LNT 34, the illustrated core 72 includes an upstream core 72a and a downstream core 72b. The upstream core 72a and the downstream core 72b can be physically separated or notionally separated at a midpoint 77. As described in further detail below, manufacturing a core 72 with a non-uniform distribution of catalyst sites 66 can be facilitated by using multiple cores 72a, 72b to form a composite core.

For purposes of teaching, referring to FIGS. 8 and 9, an exemplary typical LNT 34a and an exemplary modified LNT 34b are schematically illustrated and described in further detail. In general, the typical LNT 34a has a catalyst loading or distribution of catalyst sites 66 that is uniform along the longitudinal axis 78 while the modified LNT 34b has a catalyst loading or distribution of catalyst sites 66 that is non-uniform along the longitudinal axis 78. The illustrated longitudinal axis 78 is substantially parallel with the flow direction F through the LNT 34a, 34b.

Referring to FIG. 8, ceria (Ce), rhodium (Rh), and barium (Ba) catalyst sites 66 are uniformly distributed along the longitudinal axis 78 of the typical LNT 34a. The uniform distribution is represented by constant spacing between catalyst sites 66. For purposes of illustration, certain releasing, reduction, and oxidation reactions that occur in the typical LNT 34a during the rich cycle are shown including the reduction of NO and the oxidation of CO. Referring momentarily to FIG. 10, the CO concentration 82a decreases along the longitudinal axis 78 of the typical LNT 34a as CO is both oxidized and used in the reduction of NO at ceria (Ce) and rhodium (Rh) catalyst sites 66 respectively. NO is released at barium (Ba) catalyst sites 66 and the NO concentration 80a increases along the longitudinal axis 78 as the CO concentration is reduced moving downstream and cannot be used to effectively reduce NO. This results in NO emission without any reduction.

Referring to FIG. 9, ceria (Ce), rhodium (Rh), and barium (Ba) catalyst sites 66 are non-uniformly distributed along the longitudinal axis 78 of the modified LNT 34b. The non-uniform distribution is represented by different spacing between catalyst sites 66 and spacing from or weighting toward the upstream and downstream ends of the modified LNT 34b. Generally described, the barium (Ba) catalyst sites 66 that release NO are weighted toward the earlier or upstream part (e.g. upstream core 72a) of the modified LNT 34b and the rhodium (Rh) and ceria (Ce) catalyst sites 66 for reducing NO and oxidizing CO are weighted toward the later or downstream part (e.g. downstream core 72b) of the modified LNT 34b. Reactions generally proceed as shown. Referring to FIGS. 9 and 10, in the upstream core 72a of the modified LNT 34b, NO is released and some NO is reduced using CO. As more NO is released than is reduced, the NO concentration 80b quickly builds and the CO concentration 82b gradually decreases. In the downstream core 72b of the modified LNT 34b, less NO is released while NO released in the upstream portion is reduced by the relatively high concentration of CO. A higher concentration of NO & CO, sufficient active sites, and sufficient residence time provide higher reduction of NO leading to reduced $NO_x$ emission. As such, NO concentration 80b and CO concentration 82b quickly drop from around the midpoint 77 toward the downstream end of the modified LNTb. The modified LNT 34b can also improve fuel economy due to effective utilization of the CO from rich cycle. Less CO is lost to the oxidation reaction on ceria (Ce) sites.

Referring to FIG. 10, at the downstream end or output of the LNTs 34a, 34b, the NO concentration 80b is less than the NO concentration 80a and the CO concentrations 82a, 82b are similar. Thus, by distributing the catalyst sites 66 as described with respect to the modified LNT 34b, a greater amount of $NO_x$ is reduced and the amount of $NO_x$ that breaks through (exits) is decreased. Further, catalysts 66 are more efficiently used as a smaller amount of certain catalysts 66 can be used in the modified LNT 34b while achieving results that are as good as or better than those of the typical LNT 34a. As catalysts 66 can be expensive, the difference in material cost can be significant.

An exemplary method of assembling or manufacturing the LNT 34 is now described. Referring to FIG. 3, a non-uniform distribution of catalyst sites 66 can be achieved with a composite core 72 made up of the cores 72a, 72b. Here, the distribution of catalyst sites 66 in each core 72a, 72b is uniform although the differences in the catalysts 66 or amounts of catalysts 66 between the cores 72a, 72b gives the composite core 72 a non-uniform distribution along the longitudinal axis 78.

According to an exemplary embodiment, 60 mol/m³ of barium (Ba) and 8 mol/m³ of (PGM, Pt/Rh/Pd) are loaded in the upstream core 72a of the LNT 34 and 0 mol/m3 of barium (Ba) and 16 mol/m³ of (PGM, Pt/Rh/Pd) is loaded in the downstream core 72b of the LNT 34. In this example, there is 25% less (PGM, Pt/Rh/Pd) used in the LNT 34 as compared to the typical LNT that includes each of 60 mol/m³ of barium (Ba) and 16 mol/m³ of (PGM, Pt/Rh/Pd) uniformly distributed along the longitudinal axis 78. However, as above, the modified LNT 34 with the non-uniformly distributed catalyst 66 outperforms the typical LNT 34 with the uniformly distributed catalyst 66. Also, the decrease in the amount of catalyst used results in significant cost savings. To illustrate the difference in performance, the cumulative amount 90a of NO output by the modified LNT 34 over a time period is compared to the cumulative amount 90b of NO output by the typical LNT 34 over the time period are shown in FIG. 11.

Referring to FIGS. 1 and 12, operation of the exhaust system 30 is further described. In general, a typical exhaust system (not shown) directs the exhaust gas stream 44 (FIGS. 2 and 3, flow direction F) from the engine 20 through the TWC 32 and then through the LNT 34 during both lean operation and rich operation. In contrast, the valve 42 of the illustrated exhaust system 30 directs the exhaust gas stream 44 through the TWC 32 and then through LNT 34 during lean operation and directs the exhaust gas stream 44 through the bypass line 40 (bypassing the TWC 32) and the LNT 34 during rich operation. The operation of the valve 42 is synced with fuel injection in the engine 20 to regenerate the LNT 34.

During the rich cycle 56, fuel is injected into the engine to produce reductants like CO to regenerate the LNT 34. FIG. 12 shows the air-fuel ratio 92 of the exhaust gas stream 44 in the engine 20 and the concentration of CO in the exhaust gas stream 44 at a location 96 (FIGS. 1 and 4) in the main exhaust line 36 before entering the LNT 34. The CO concentration 94a is plotted for an exhaust gas stream 44 that is directed through the TWC 32 (as in a typical exhaust system). The CO concentration 94b is plotted for an exhaust gas stream 44 that is directed through the bypass line 40.

In comparing CO concentrations 94a, 94b, it is observed that the TWC 32 consumes a significant amount of CO and thus a large amount of the CO produced in the engine is not used to regenerate the LNT. For example, the applicant has found that the TWC 32 can consume more than fifty percent of the CO produced in the engine 20.

Regeneration efficiency can be measured by the CO concentration in the exhaust gas stream 44 as it enters the LNT 34 resulting from fuel injected into the engine 20 divided by the amount of fuel injected into the engine 20. For a pulse 98 of fuel injected into the engine 20, the resulting pulse 100b in CO concentration 94b is greater (for example in amplitude and duration) than the pulse 100a in CO concentration 94a. Thus, it is more efficient to bypass the TWC 32 during rich operation to deliver CO to the LNT 34. The increase in efficiency allows for a shorter rich cycle or otherwise for use of less fuel.

In addition, reduction of $NO_x$ increases as the temperature of the LNT 34 is lowered during rich tip-in or the rich cycle by the temperature control device 46. During rich tip-ins the amount of $NO_x$ in the exhaust gas stream 44 entering the LNT 34 is very low, which drives the $NO_x$ storage rates to zero since $NO_x$ storage rate is substantially directly proportional to $NO_x$ concentration in the gas phase. Therefore, the release rate of $NO_x$ relative to its storage rate becomes high leading to a $NO_x$ breakthrough. As the NOx release rate increases exponentially with increase in temperature, NOx breakthrough can be reduced by reducing the temperature of the LNT 34 to drive down the release rate.

The temperature control device 46 can control the temperature of the LNT, for example, by forced air cooling such as with a fan or by using an external jacketed convector through which a fluid or coolant is pumped. The operation of the temperature control device 46 is configured to begin cooling with the fuel injection at the beginning of rich cycle. For example the operation of the temperature control device 46 can be synced with the operation of the engine 20.

Referring to FIG. 4, a controller 102 synchronizes operation of the engine 20, the valve 42, and the temperature control device 46.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. An exhaust system, comprising:
a main line including a three-way converter and a lean $NO_x$ trap connected to and positioned downstream of the three-way converter;
a bypass line connected to the main line at an upstream junction and at a downstream junction;
a valve connected at the upstream junction to the main line and the bypass line for controlling whether an exhaust gas stream of an engine is directed through the main line to the three-way converter and on to the lean $NO_x$ trap or through the bypass line to bypass the three-way converter and flow directly to the lean $NO_x$ trap;
a temperature-control device configured to selectively control a temperature of the lean $NO_x$ trap; and
a controller being in communication with the engine, the valve, the three-way converter, and the temperature-control device, and configured to:
receive, from the engine, signals indicating whether the engine is operating in a rich cycle or a lean cycle;
control, based on the signals received from the engine, operation of the temperature-control device to synchronize the operation of the temperature-control device to the engine operation indicated by the signals received; and
control, based on the signals received from the engine, operation of the valve to synchronize the operation of the valve to the engine operation indicated by the signals received.

2. The exhaust system of claim 1, wherein the lean $NO_x$ trap comprises catalyst distributed non-uniformly along a longitudinal axis of the lean $NO_x$ trap such that storage sites of the catalyst are weighted toward an upstream end of the lean $NO_x$ trap and oxidation and reduction sites of the catalyst are weighted toward a downstream end of the lean $NO_x$ trap.

3. The exhaust system of claim 2, wherein the storage sites comprise barium, the reduction sites comprise rhodium, and the oxidation sites comprise ceria.

4. The exhaust system of claim 1, wherein the temperature-control device is coupled to the lean $NO_x$ trap.

5. The exhaust system of claim 1, wherein:
the signals received from the engine indicate an air-fuel ratio indicative of whether the engine is operating in the rich cycle or the lean cycle; and
the controller, in being configured to control operation of the valve to synchronize operation of the valve to the operation of the engine, including controlling the valve to direct, during the lean cycle, an exhaust gas stream through the three-way converter and to direct, during the rich cycle, the exhaust gas stream through the bypass line.

6. The exhaust system of claim 1, wherein the controller, in being configured to synchronize the operation of the valve and of the temperature-control device to the operation of the engine, is configured to:
control the valve to, when the engine is operating in the rich cycle, direct the exhaust gas stream through the bypass line;
control the temperature-control device to, when the engine is operating in the rich cycle, lower a temperature of the lean $NO_x$ trap; and
control the valve to, when the engine is operating in the lean cycle, direct the exhaust gas stream through the main line, between the upstream junction and downstream junction, and on to the three-way converter.

7. The exhaust system of claim 1, wherein:
the signals received from the engine indicate an air-fuel ratio indicative of whether the engine is operating in the rich cycle or the lean cycle; and
the controller, in being configured to control the temperature-control device to synchronize operation of the temperature-control device to the operation of the engine, is configured to cause, during the rich cycle of the engine, the temperature-control device control device to lower the temperature of the lean $NO_x$ trap.

8. The exhaust system of claim 1, wherein the controller, in being configured to synchronize the operation of the temperature-control device to the operation of the engine, is configured to cause, when the engine is operating in the rich cycle, the temperature-control device to cool the lean $NO_x$ trap using a convector through which a fluid or coolant is pumped.

9. The exhaust system of claim 8, wherein the temperature-control device comprises an external jacketed convector through which a fluid or coolant is pumped.

10. A controller system, for use in an exhaust system comprising (a) a main line-including a three-way converter and a lean $NO_x$ trap positioned downstream of the three-way converter, (b) a bypass line connected to the main line at an upstream junction and at a downstream junction, (c) a valve connected to the main line and the bypass line at the upstream junction for controlling whether an exhaust gas stream of an engine is directed through the main line to the three-way converter and on to the lean $NO_x$ trap or through the bypass line to bypass the three-way converter and flow directly to the lean $NO_x$ trap, and (d) a temperature-control device configured to selectively control a temperature of the lean $NO_x$ trap, the controller system comprising:
a non-transitory controller configured to:
communicate with the engine during operation of the exhaust system;
communicate with the valve during operation of the exhaust system;
communicate with the temperature-control device during operation of the exhaust system;
receive, from the engine, signals indicating whether the engine is operating in a rich cycle or a lean cycle;
control, based on the signals received from the engine, operation of the temperature-control device to synchronize the operation of the temperature-control device to the engine operation indicated by the signals received; and
control, based on the signals received from the engine, operation of the valve to synchronize the operation of the valve to the engine operation indicated by the signals received.

11. The controller system of claim 10, wherein the controller, in being configured to synchronize the operation of the valve and of the temperature-control device to the operation of the engine, is configured to:
- control the valve to, when the engine is operating in the rich cycle, direct the exhaust gas stream through the bypass line;
- control the temperature-control device to, when the engine is operating in the rich cycle lower a temperature of the lean $NO_x$ trap; and
- control the valve to, when the engine is operating in the lean cycle, direct the exhaust gas stream through the main line, between the upstream junction and downstream junction, and on to the three-way converter.

12. The controller system of claim 10, wherein the lean $NO_x$ trap comprises catalyst distributed non-uniformly along a longitudinal axis of the lean $NO_x$ trap such that storage sites of the catalyst are weighted toward an upstream end of the lean $NO_x$ trap and oxidation and reduction sites of the catalyst are weighted toward a downstream end of the lean $NO_x$ trap.

13. The controller system of claim 10, wherein the storage sites comprise barium, the reduction sites comprise rhodium, and the oxidation sites comprise ceria.

14. The controller system of claim 10, wherein the temperature-control device is coupled to the lean $NO_x$ trap.

15. The controller system of claim 10, wherein:
- the signals received from the engine indicate an air-fuel ratio indicative of whether the engine is operating in the rich cycle or the lean cycle; and
- the controller, in being configured to control operation of the valve to synchronize operation of the valve to the operation of the engine, including controlling the valve to direct, during the lean cycle, an exhaust gas stream through the three-way converter and to direct, during the rich cycle, the exhaust gas stream through the bypass line.

16. The controller system of claim 10, wherein the controller, in being configured to synchronize the operation of the valve and of the temperature-control device to the operation of the engine, is configured to:
- control the valve to, when the engine is operating in the rich cycle, direct the exhaust gas stream through the bypass line;
- control the temperature-control device to, when the engine is operating in the rich cycle, lower a temperature of the lean $NO_x$ trap; and
- control the valve to, when the engine is operating in the lean cycle, direct the exhaust gas stream through the main line, between the upstream junction and downstream junction, and on to the three-way converter.

17. The controller system of claim 10, wherein:
- the signals received from the engine indicate an air-fuel ratio indicative of whether the engine is operating in the rich cycle or the lean cycle; and
- the controller, in being configured to control the temperature-control device to synchronize operation of the temperature-control device to the operation of the engine, is configured to cause, during the rich cycle of the engine, the temperature-control device control device to lower the temperature of the lean $NO_x$ trap.

18. The controller system of claim 10, wherein the controller, in being configured to synchronize the operation of the temperature-control device to the operation of the engine, is configured to cause, when the engine is operating in the rich, the temperature-control device to cool the lean $NO_x$ trap using fluid convection, constituting a cooling function.

19. The controller system of claim 10, wherein the temperature-control device comprises an external jacketed convector through which a fluid or coolant is pumped.

* * * * *